(12) United States Patent
Stegemann et al.

(10) Patent No.: US 8,222,563 B2
(45) Date of Patent: Jul. 17, 2012

(54) BEAM CAPTURING DEVICES FOR PROCESSING MACHINES

(75) Inventors: Carsten Stegemann, Harl (DE); Martin Blaser, Vogt (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 220 days.

(21) Appl. No.: 12/720,944

(22) Filed: Mar. 10, 2010

(65) Prior Publication Data

US 2010/0206858 A1  Aug. 19, 2010

Related U.S. Application Data

(63) Continuation of application No. PCT/EP2007/007908, filed on Sep. 11, 2007.

(51) Int. Cl.
*B23K 26/16* (2006.01)
(52) U.S. Cl. .............. 219/121.67; 219/121.72
(58) Field of Classification Search ........ 219/121.67–121.72, 121.84, 121.86
See application file for complete search history.

(56) References Cited

U.S. PATENT DOCUMENTS

| | | | | |
|---|---|---|---|---|
| 4,078,165 A | * | 3/1978 | Tuttle | 219/121.84 |
| 4,539,463 A | * | 9/1985 | Piccioli et al. | 219/121.67 |
| 4,864,098 A | * | 9/1989 | Basanese et al. | 219/121.61 |
| 5,516,998 A | * | 5/1996 | Chatelain et al. | 219/121.7 |
| 6,316,744 B1 | * | 11/2001 | Nowotny et al. | 219/121.84 |
| 7,847,215 B2 | | 12/2010 | Blaser et al. | |

FOREIGN PATENT DOCUMENTS

| | | |
|---|---|---|
| JP | 60238472 A * | 11/1985 |
| WO | WO9423884 A1 | 10/1994 |
| WO | WO2007028402 A1 | 3/2007 |
| WO | WO2007028404 A1 | 3/2007 |
| WO | WO2007028403 A9 | 6/2007 |

OTHER PUBLICATIONS

International Search Report for corresponding PCT Application No. PCT/EP2007/007908, mailed Jun. 6, 2008, 2 pages.
International Preliminary Report on Patentability form corresponding PCT Application No. PCT/EP2007/007908, issued Apr. 7, 2010, 5 pages.

* cited by examiner

*Primary Examiner* — Samuel M Heinrich
(74) *Attorney, Agent, or Firm* — Fish & Richardson P.C.

(57) ABSTRACT

A beam capturing device for a processing machine includes a housing and at least one rotating body. The housing includes a substantially linear opening for receiving a cutting beam from the processing machine during processing of a workpiece. The at least one rotating body is arranged beneath the opening in the housing. The at least one rotating body is arranged to be rotationally driven about its axis of rotation and is arranged to absorb energy from the cutting beam entering the housing through the opening.

17 Claims, 4 Drawing Sheets

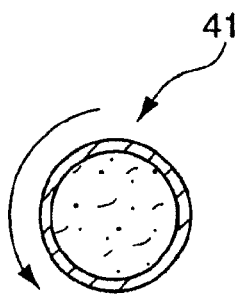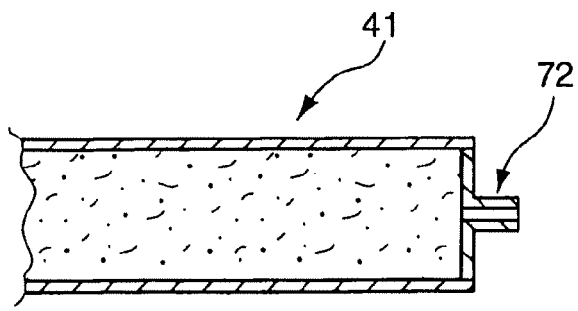
Fig. 5a  Fig. 5b
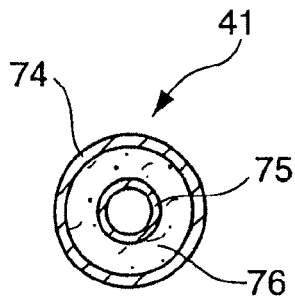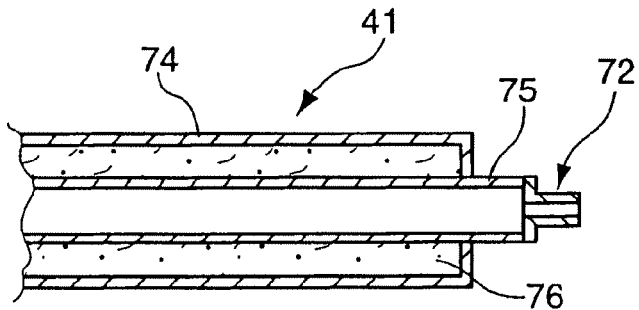
Fig. 6a  Fig. 6b
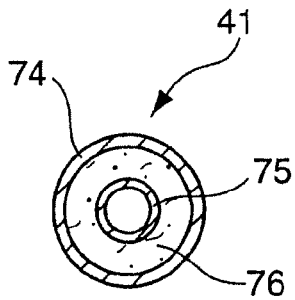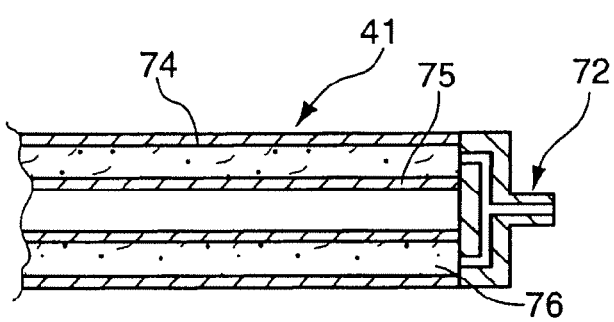
Fig. 7a  Fig. 7b
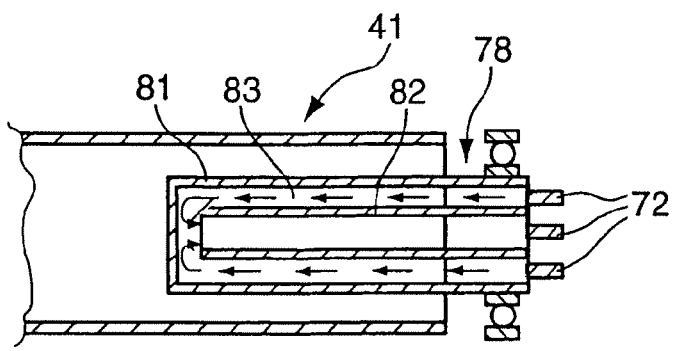
Fig. 8

BEAM CAPTURING DEVICES FOR PROCESSING MACHINES

CROSS REFERENCE TO RELATED APPLICATION

This application is a continuation of and claims priority under 35 U.S.C. §120 to PCT/EP2007/007908, filed on Sep. 11, 2007, and designating the U.S., the entire contents of which are hereby incorporated by reference.

TECHNICAL FIELD

The invention relates to beam capturing devices for processing machines.

BACKGROUND

WO 2007/028403 A1 discloses a beam capturing device for a processing machine that has a housing provided with a line-like opening facing towards the cutting beam. The cutting beam exiting from the bottom surface of a workpiece enters the housing through said opening. Within the housing, a revolving belt is provided in order to absorb the energy of the cutting beam. This revolving belt within the housing permits melting loss, slag, dust, and additional energy carried along to be removed. The revolving belt also permits a continuous absorption of the energy of the cutting beam entering the housing through the opening.

Beam capturing devices of this type are increasingly exposed to a high stress. For example, the degrees of efficiency of the cutting beam are increased in order to make it possible to cut thicker workpieces. This leads to an increased heat input into the beam capturing device and to an increased amount of slag, dust and melting loss produced.

SUMMARY

In general, this invention relates to beam capturing devices for processing machines for the machining of workpieces using a cutting beam.

One aspect of the invention provides a beam capturing device for a processing machine that includes a housing and at least one rotating body. The housing includes a substantially linear opening for receiving a cutting beam from the processing machine during processing of a workpiece. The at least one rotating body is disposed within the housing beneath the opening for absorbing energy from the cutting beam. The at least one rotating body can provide for a substantially linear absorption of energy, taking place about the circumference of the rotating body, as well as a deviation or deflection of slag, sparks and processing gases with respect to the direction of entry of the cutting beam.

In some embodiments, the at least one rotating body is arranged to be rotationally driven about its axis of rotation. This arrangement can provide for a substantially linear energy absorption to take place in the circumferential direction of the rotating body so as to achieve good energy absorption and/or heat dissipation.

In certain embodiments, the at least one rotating body is movable, e.g., in both directions, along its axis of rotation. This translational movement of the rotating body can also contribute to the absorption of energy. In some cases, the rotational movement of the rotating body about its axis of rotation can be combined with the translational movement along said axis of rotation.

In some embodiments, the at least one rotating body comprises a roller that extends along the length of the opening of the housing. By providing, for example, a roller that is supported by bearings formed on respective end faces of the housing and an outer lateral area of which crosses the cutting beam entering through the opening, a simple design configuration can be achieved.

In certain embodiments, the rotating body is arranged off-center with respect to the cutting beam entering the housing through the opening. This can allow for a well-directed deviation and/or deflection of sparks, slag or melting loss to be achieved so as to avoid a back-reflection of the sparks, the slag or the melting loss in the direction of the opening and/or towards the bottom surface of the workpiece undergoing processing.

In some embodiments, the off-center position of the at least one rotating body, relative to the housing, is variable and the at least one rotating body is movable at least in the x-direction (transverse to the direction of the cutting beam and the axis of rotation of the at least one rotating body). This makes it possible for the at least one rotating body to be adjusted in its off-center position with respect to the opening of the housing. In addition to the translational movement of the at least one rotating body in the x-direction, a translational movement in the y-direction and/or the z-direction of the at least one rotating body within the housing can equally be provided in order to adjust the position of the at least one rotating body within the housing and/or with respect to the opening of the housing or the entering cutting beam. In addition, the position of the at least one rotating body within the housing can be adjusted in such a manner with regard to the incident cutting beam as to obtain a widening of the reflected radiation so as to achieve a large width of dispersion of the reflected radiation, said radiation having a considerably reduced energy density.

In certain embodiments, a lateral area of the at least one rotating body is conically tapered towards one end face of the at least one rotating body. This can, for example, encourage a removal of parts. Owing to the conical configuration, a component part or residual part impacting the at least one rotating body is redirected by the conical shape in a predetermined direction. This can encourage a removal of the parts.

In some embodiments, the rotating body includes a solid roller. The absorbed heat can thus be dissipated rapidly across a large volume into the at least one rotating body.

In some embodiments, the at least one rotating body includes a hollow roller. The hollow roller can include an inlet port, arranged on an end face of the hollow roller, for feeding a medium into the hollow roller. This arrangement can help to provide a weight-reduced configuration of the rotating body. In addition, the inlet port can be used to introduce a cooling medium into the interior of the hollow roller in order to provide additional cooling, thus allowing for an enhanced absorption of energy. In some cases, for example, a port allowing for the passage of a medium can provided on each end face of the hollow roller to allow for a feedthrough of the medium. The medium can be a gaseous medium or a liquid medium (e.g., water).

In certain embodiments, the at least one rotating body includes a double-walled roller. The double-walled roller includes an outer tube and an inner tube. The outer tube and the inner tube together define a space that can be filled with a medium. This arrangement can help to increase the energy absorption and the heat dissipation. In some cases, the double-walled roller can be filled with a medium and evacuated if a port is provided on one side. In some cases, the double-walled roller can be traversed by a medium if a port is provided on each end face thereof.

In some embodiments, at least one end face of the inner tube of the double-walled roller includes an inlet port for feeding a medium. This can allow for each of the interior space and the space between the walls to be filled with, or traversed by, a medium, such as a gas medium or liquid medium, in order to achieve a high degree of energy and heat absorption.

In certain embodiments, the outer tube and the inner tube are arranged in a rotatable manner with respect to each other. In some cases, for example, a stationary inner tube can be provided, with an outer tube rotating about the stationary inner tube. Thus, a turbulence can be created in the medium provided in the space between the inner tube and the outer tube so as to achieve an improved heat transmission. This is advantageously the case if in the interior of the inner tube a further medium is provided which, preferably, is equally exchanged. Alternatively, the inner tube can be rotationally driven and set in rotation with respect to the outer tube, either in the same direction or in the opposite direction.

In certain embodiments, the inner tube of the double-walled roller is disposed off-center with respect to the outer tube. This arrangement can help to promote a forced circulation of the medium present in the space between the inner tube and the outer tube, which can help to provide for improved cooling.

According to a further alternative configuration of the rotating body in the form of a double-walled roller, provision is made for a forced circulation of a medium to take place in a space between the inner tube and the outer tube and, subsequently, through the interior of the inner tube. In this way, a uniform cooling of the roller can be achieved. Preferably, the inlet port and the outlet port are both provided on one end face of the roller, such that the design of the roller is simplified.

In certain embodiments, the rotating body is supported within the housing by a bearing formed on one side of the housing. Thus, a kind of cantilever bearing can be provided.

In some embodiments, the rotating body can include a tubular roller and a cooling unit that protrudes into the tubular housing. The cooling unit can include a cartridge that provides for forced circulation of a medium. A bearing of the tubular roller, as well as that of the cooling unit are arranged either on or outside the housing. In this way, the risk of soiling of the bearing by slag, dust or sparks can be reduced or eliminated.

In some embodiments the rotating body is fabricated from a material having a good thermal conductivity, such as copper or materials containing copper. On the one hand, materials of this type allow for a good heat dissipation and, on the other hand, these materials are not likely to become welded or connected with other materials, such that the risk of their permanent adhesion to the surface of the rotating body is considerably reduced.

In certain embodiments, an outer lateral area of the rotating body has a processed, e.g., a roughened, surface. Thus, a deliberate adhesion of slag may be achieved, so as to allow for a rapid removal of the slag. As a result, reflection of the contaminants in the direction of the opening formed in the housing may be reduced, such that the bottom surface of the workpiece undergoing processing is kept from being impaired by sparks or slag. In addition, the rotating body, which is rotationally driven, allows an automatic detaching of debris due to the centrifugal forces, once the layer has grown to a greater thickness.

In some embodiments, the beam capturing device also includes a cleaning device for removing slag, melting loss, and contaminants adhering to the at least one rotating body. The cleaning device is arranged to act on an outer lateral area of the at least one rotating body. This arrangement can help to prevent the rotating body from becoming overgrown and to counteract a formation of layers of slag, melting loss, or contaminants on the rotating body. In addition, a cleaning device of this type may perform a cleaning operation on every rotation of the rotating body, thereby permitting an improved heat dissipation.

The cleaning device can include a brush (e.g., a rotating brush), a scraper, a scratcher, or a rotating roller. The individual cleaning devices may be provided depending on the installation conditions.

In certain embodiments, the housing can include at least one suction opening for connection to a suction device. The at least one suction opening can be provided on a side or on the bottom of the housing. In some cases, a feeding appliance for a medium is provided between the opening of the housing and the rotating body. The feeding appliance can have an inflow direction that is oriented perpendicular to the longitudinal extension of the at least one rotating body or to the opening of the housing. The connection of a suction device to the at least one suction opening of the housing can allow for evacuation of gases, sparks, and dusts generated due to the cutting process and which have entered the housing through the opening. At the same time, a cooling effect may be achieved via the connected suction device. In addition, the contaminants and slag particles deviated by the rotating body may be evacuated.

Via a feeding appliance, a gaseous or liquid medium, in particular air, may at the same time be supplied in order to achieve a lateral deflection of the contaminants, slag, and sparks reflected by the rotating body and to supply the latter to the suction device, such that a back-reflection of the particles that have entered the housing together with the cutting beam is inhibited (e.g., prevented).

The feeding appliance for the medium can extend along the length of the opening of the housing. The feeding appliance can be activated segment-wise. In this way, a segment of the feeding appliance for the medium corresponding to a region in which the cutting beam is located can be activated. Alternatively, provision may be made for the feeding appliance to be capable of being switched on depending on the position of the cutting beam entering the housing through the opening. In this way, the regions situated in front of and behind the cutting beam in and against the direction of movement of the cutting beam may be set and individually adjusted.

In some embodiments, a non-adhesion coating is provided at least on lateral wall portions in the housing. Contaminants, slag, and sparks that are deviated by the rotating body due to the rotation are deviated in the direction of the lateral wall portions. In order to inhibit (e.g., prevent) soiling of the lateral walls or to inhibit (e.g., prevent) them from becoming overgrown, a non-adhesion coating is applied. In addition, a cleaning process, for example by shaking the housing, may be sufficient to lead to a detaching or falling off of contaminants that may have accumulated thereon.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 5a and 5b are schematic views, in cross-section and in longitudinal section, respectively, of a rotating body within the beam capturing device of FIG. 2;

FIGS. 6a and 6b are schematic views, in cross-section and in longitudinal section, respectively, of an alternative embodiment of the rotating body of FIG. 2;

FIGS. 7a and 7b are schematic views, in cross-section and in longitudinal section, respectively, of an alternative embodiment of the rotating body of FIG. 2; and FIG. 8 is a schematic view in longitudinal section of an alternative embodiment of the rotating body of FIG. 2.

DETAILED DESCRIPTION

Figure 1:
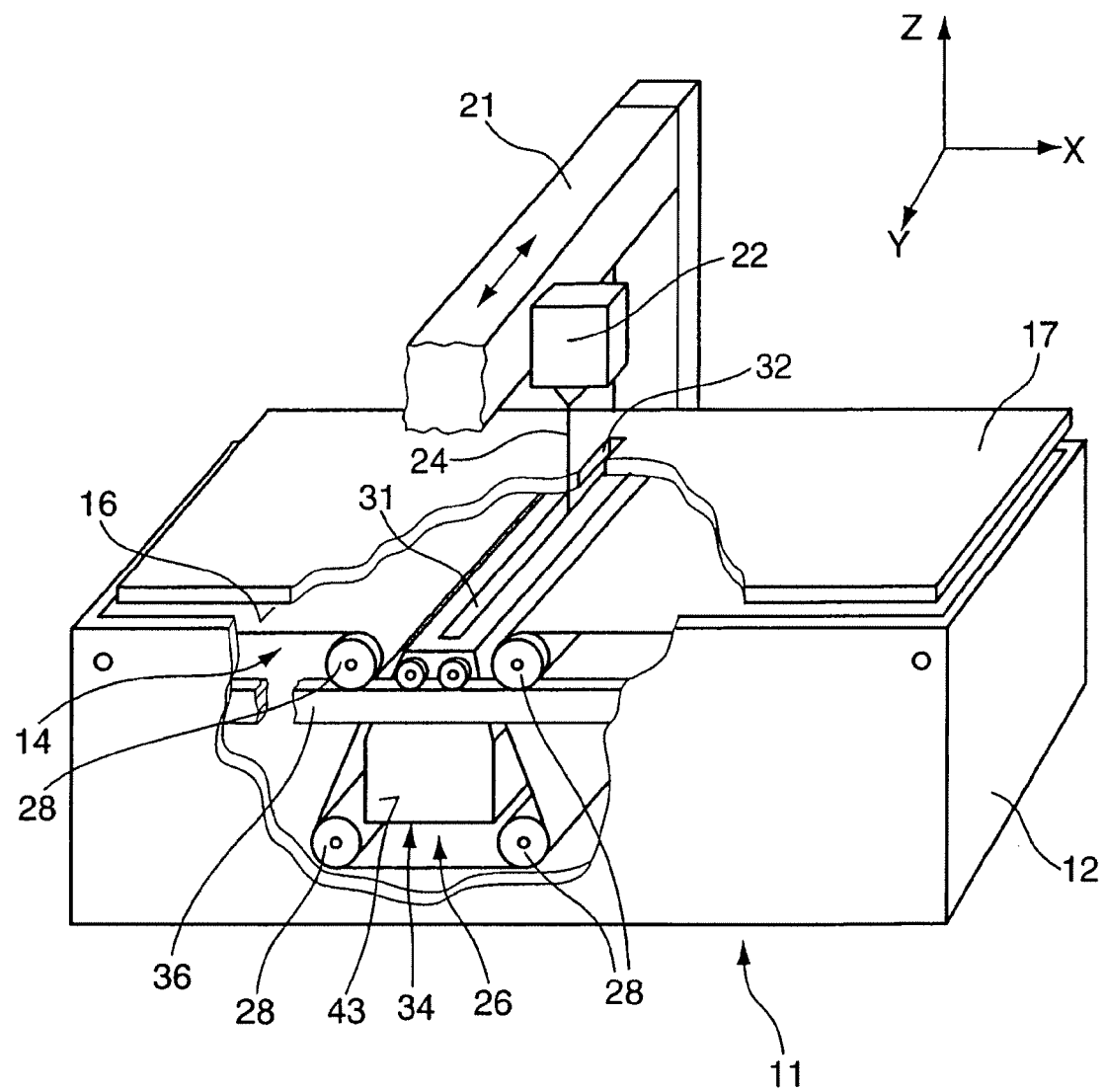
FIG. 1 is a perspective view of a processing machine having a beam capturing device in an installed position.

FIG. 1 is a perspective representation of a processing machine 11. The processing machine 11 can be a laser cutting machine. Alternatively, a processing machine having a plasma beam or burning beam may be provided. A machine bed 12 includes a workpiece support 14 that can be formed by a supporting belt 16 that is held stationary within the machine bed 12. In some cases, the supporting belt may also be driven so as to fulfill additional transporting functions. Via a linear axis 21, a cutting head 22 is movable in the y-direction, forming a working range of the cutting head 22. In addition, a linear axis may be provided which moves in and against an x-direction. Furthermore, a linear axis variable in height may also be provided. A cutting beam 24 is directed at the workpiece 17 from the cutting head 22 so as to perform machining of the workpiece 17.

A beam capturing device 26 is arranged beneath a bottom surface of the workpiece 17. The beam capturing device 26 is positioned within the working range of the cutting head 22 and is positioned between deflection rollers 28 of the supporting belt 16. In some cases, the beam capturing device 26 can be movable, e.g., on a guide 36, in and against the x-direction. The beam capturing device 26 can be coupled to the movement of the cutting head 22, for example by means of a drive of its own, or following said movement without having a drive of its own.

The beam capturing device 26 has an opening 31 that is oriented towards the cutting head 22. The opening 31 extends along the entire working range of the cutting head 22 in the y-direction. During the processing of the workpiece 17, the cutting beam 24 exiting from the bottom surface of the workpiece 17 after having realized a cutting gap 32 may pass through the opening 31 and be captured by a housing 34 of the beam capturing device 26.

Figure 2:
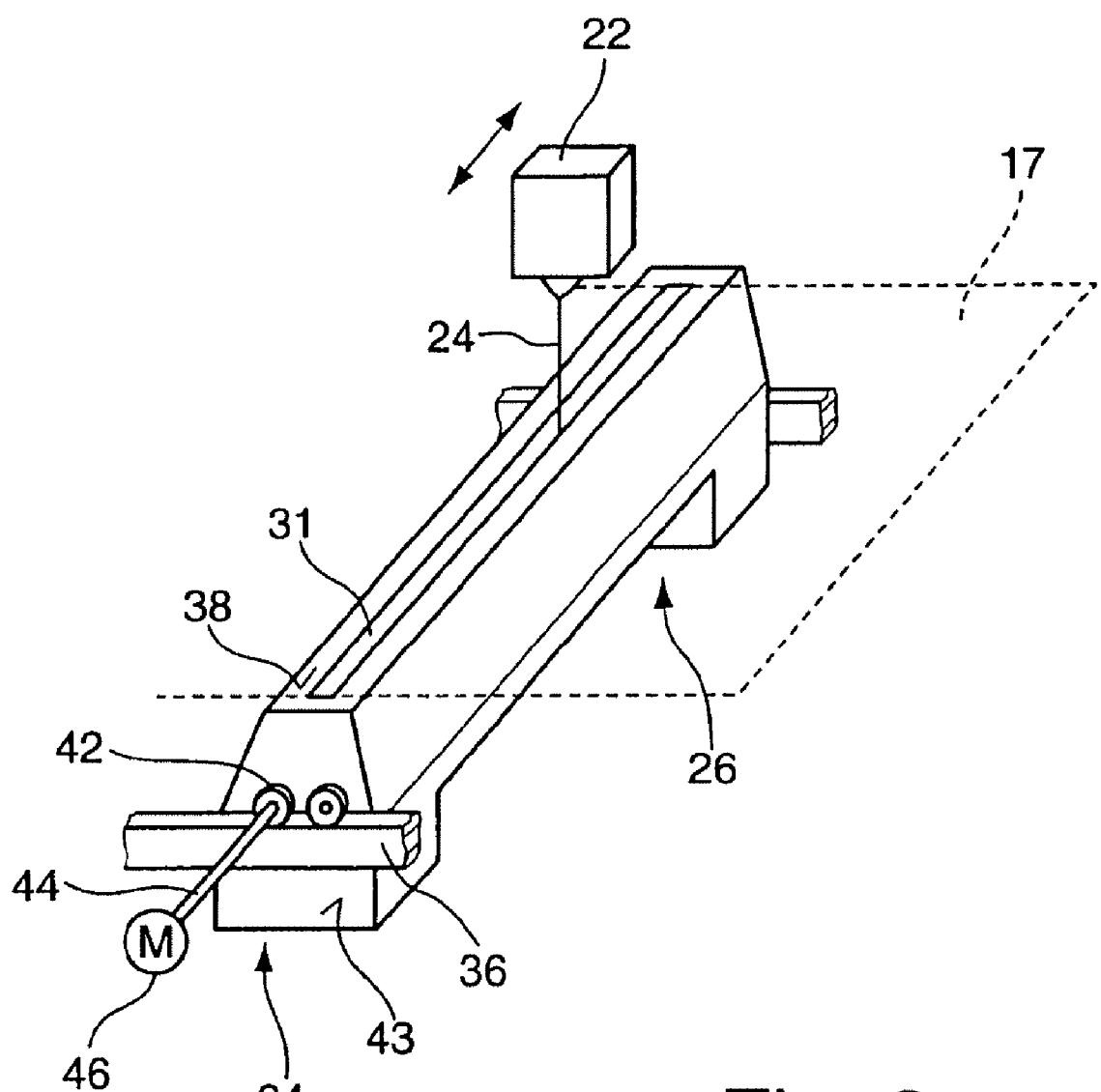
FIG. 2 is a perspective view of a beam capturing device.

FIG. 2 represents a perspective view of the beam capturing device 26. The beam capturing device 26 has a closed housing 34 that includes an opening 31. The opening 31 is formed on an end face 38 of the housing 34 that faces towards the workpiece 17.

Figure 3:
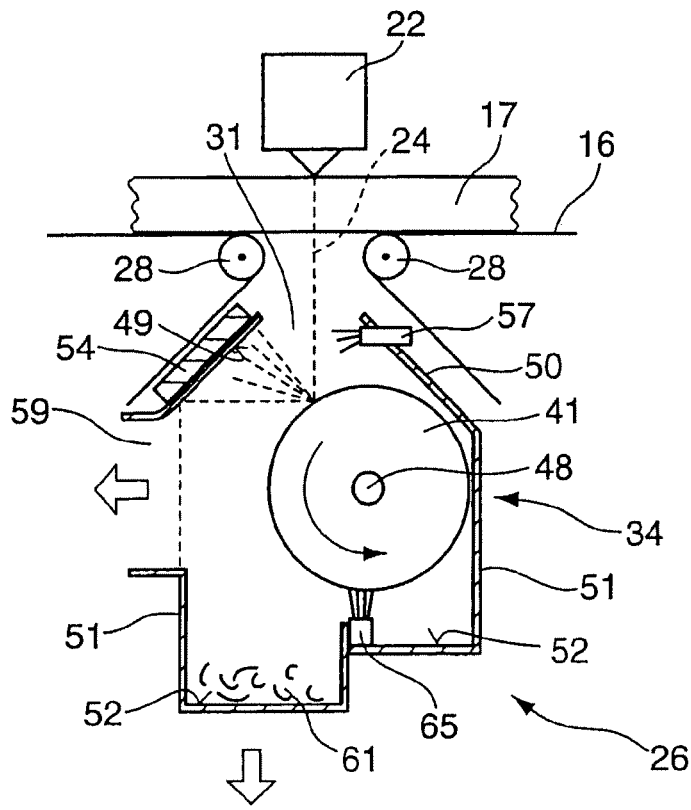
FIG. 3 is a schematic cross-section of the beam capturing device of FIG. 2.
Figure 4:
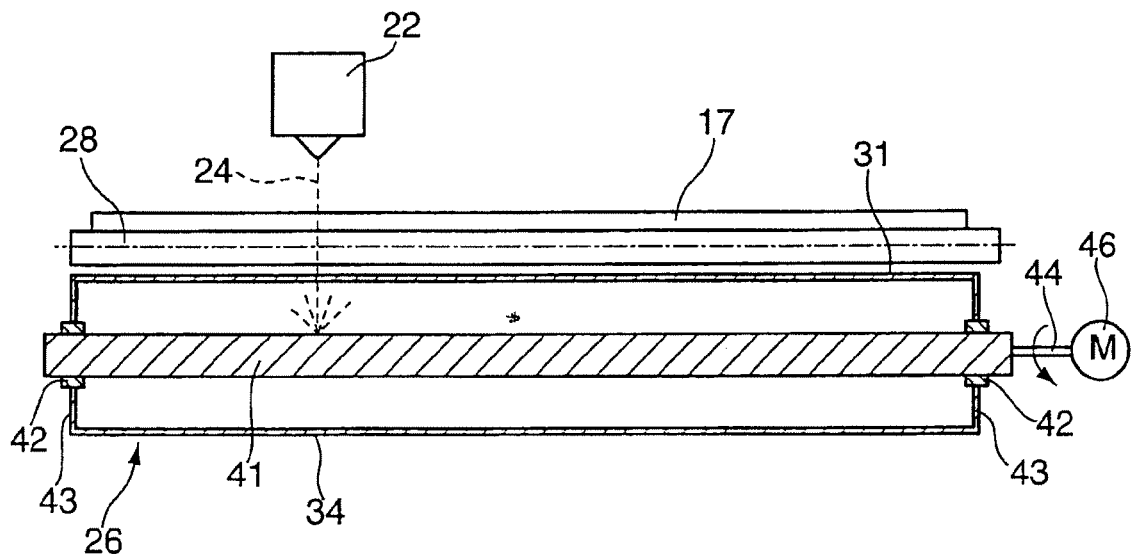
FIG. 4 is a schematic longitudinal section of the beam capturing device of FIG. 2.

FIG. 3 represents a schematic, cross-sectional view of the beam capturing device 26 according to FIG. 2. FIG. 4 shows the beam capturing device 26 according to FIG. 2 in a longitudinal section.

A rotating body 41 is arranged within the housing 34 and is situated beneath the opening 31. as the rotating body 41 can include a roller. This rotating body 41 is accommodated by bearings 42 (FIG. 2) provided on end faces 43 of the housing 34 in such a way as to be rotatable. A driving shaft 44 is arranged on an end face 43 of the housing 34. The driving shaft 44 so as to protrudes from the housing 34 and is set in rotation by a drive 46.

Referring to the embodiment illustrated in FIGS. 3 and 4, the rotating body 41 can include a circular rotating body, e.g., a cylinder having a circular sectional area. The rotating body 41 is realized, for example, as a roller made of a solid piece or as a hollow roller. Within the housing 34, the rotating body 41 is disposed off-center with respect to the cutting beam 24, so that the cutting beam 24 is inhibited (e.g., prevented) from impinging on the portion of the lateral area of the rotating body lying closest to the opening, in order to avoid a total reflection of the incident cutting beam 24. Rather, this off-center disposition makes it possible, by the scientific principle according to which the acceptance angle is equal to the exit angle, to obtain a lateral deflection of the cutting beam 24 and of the sparks, slag, and contaminants that have entered the housing 34 through the opening 31 together with the cutting beam 24. In addition, the incident cutting beam is dispersed as it is reflected.

In order to enhance the linear energy absorption, the rotating body 41 is set in rotation by the drive 46. Thus, a linear energy absorption is achieved on the circulating lateral area of the rotating body 41. In addition to, or as an alternative to, the rotational movement of the rotating body 41 about its axis of rotation 48, a translational movement of the rotating body 41 along its axis of rotation 48 and/or in or against the y-direction may be provided. Furthermore, a combination of the rotational movement about the axis of rotation 48 and the translational movement in both directions along the axis of rotation 48 may be activated for the purpose of energy absorption.

The configuration of the rotating body 41 can provide for a robust and simple, and thus cost-effective, construction for energy absorption. In addition, a reduced noise nuisance as well as an increased operational safety may be achieved during the operation of this beam capturing device 26. By the configuration of a rotating body 41 for energy absorption, a widening of the portions of reflected radiation of the cutting beam 24 is made possible, so that an additional absorbent body such as a beam trap may be dispensed with. At the same time, the cutting beam 24 impinging off-center on the rotating body 41 not only leads to a more effective coupling or energy absorption of the cutting beam 24 but also to a shaped reflection of the portions of unabsorbed radiation within the housing 34. In addition, the linear energy absorption occurring in the circumference of the rotating body 41 leads to a heating of the rotating body 41 which causes a change in length that is effective only in the longitudinal direction, which in terms of design may be taken into account in a simple manner, for example by a bearing having a fast-and-loose arrangement.

The housing 34 has wall portions 49, 50 disposed immediately adjacent to the end face 38 and expanding the interior space of the housing 34. These are adjoined by wall portions 51 extending parallel to each other and merging with a bottom 52. Owing to the off-center arrangement of the rotating body 41, one wall portion 49 is exposed to an increased amount of reflected radiation, slag, and contaminants. This wall portion 49 can be formed with a beam plate or baffle plate 54 that is cooled by a cooling medium, e.g., water. A feeding appliance 57 can be provided in the wall portion 50. The feeding appliance 57 is disposed opposite this wall portion 49 and extends along the wall portion 50 over the entire length of the housing.

The feeding appliance 57 can include a plurality of nozzles, e.g., sheet dies, which are, for example, positioned next to one another in a row so as to introduce a medium into the housing 34. The medium introduced may be a liquid medium or gaseous medium (e.g., air). The feeding appliance 57 is oriented in such a manner that the incident cutting beam and/or the sparks, slag, and contaminants entering the housing 34 through the opening 31 together with said beam are deflected and redirected in the direction of the baffle plate 54. A suction opening 59, surrounded by a suction collar 60, is provided in the wall portion 51 below the wall portion 49. A suction device can be connected to the suction collar 60 (FIG. 3) for evacuating the medium introduced via the feeding appliance 57. Thus, sparks, slag and the like, which, on the one hand, are reflected by the rotating body 41 may, on the other hand, be evacuated from the housing 34 by the feeding appliance 57 via the suction collar 60. The rotation of the rotating body 41 can be such that the deflection of the reflecting radiation, slag, sparks, and contaminants occurs in an opposite direction with respect to the off-center offset of the axis of rotation 48 relative to the cutting beam 24.

On the bottom 52 of the housing 34, a collecting tray 61 for small parts, slag and other contaminants is provided. This collecting tray 61 can be perforated and can be connected to the suction device, such that sparks, slag, and contaminants can be aspirated via the bottom 52.

The beam capturing device 26 can also include a cleaning device 65 for cleaning the rotating body 41. The cleaning device 65 can be arranged on the bottom 52 of the housing 34 or on a wall portion 51 near the bottom 52. In some cases, the cleaning device 65 includes a brush strip that acts on the rotating body 41 in motion. In this way, slag, sparks or contaminants adhering to the lateral area of the rotating body 41 are removed and pass into the collecting tray 61 where they can be evacuated. The detaching effect from the surface of the rotating body 41 may, in addition, be assisted by a high-temperature non-adhesion coating applied to the lateral area of the rotating body 41.

A regulating device may be provided between the housing 34 and the rotating body 41 to adjust the off-center position of the rotating body 41 with respect to the cutting beam 24 entering the housing 34 through the opening 31. The rotating body 41 has an axis of rotation which is preferably parallel with a wall portion 51 or is aligned with respect to a linear opening 31. In some cases, the axis of rotation 48 of the rotating body 41 can be oriented in such a manner as to form an acute angle with respect to the y-direction of travel of the cutting angle. In addition, the rotating body 41 can be conically tapered towards one end face of the rotary body 41, the arrangements described above being equally applicable for the conically formed rotating body 41 as far as its position and orientation is concerned.

In some cases, the rotating body 41 can include a plurality of shorter rollers disposed along a common axis of rotation or which are offset with respect to each other in such a manner that their respective edge regions define a range of overlap in order to prevent the cutting beam 24 from passing therebetween and impinging on the bottom 52. In the case of a plurality of rotating bodies 41, the axes of rotation of the rotating bodies can extend parallel with the y-axis or in an acute angle thereto. Provision may alternatively be made for the plurality of rotating bodies 41 to include an axis of rotation which is oriented in the x-direction. In the case of an arrangement of this type, the individual rotating bodies 41 may equally be assigned to each other, for example upright in a zigzag line, such that the cutting beam 24 will always impinge on a rotating body 41 while traveling along the y-axis.

FIG. 5a represents a schematic view in cross-section of a first embodiment of the rotating body 41 and FIG. 5b represents a schematic view in longitudinal section of the first embodiment of the rotating body 41. In embodiment illustrated in FIGS. 5a and 5b, the rotating body 41 includes a tube or hollow shaft that is provided on at least one end face with an inlet port 72 for feeding a medium. The hollow shaft is filled, for example, with water for cooling. If a port is provided on both sides, provision may be made for the hollow shaft to be traversed by the medium. Owing to this design configuration for cooling the rotating body 41, the thermal distortion of the hollow shaft may be kept low. This also contributes to improve the stress resistance. In addition, a higher degree of energy absorption may be achieved. A configuration of this type can allow for a robust, simple and cost-effective construction.

FIG. 6a represents a schematic view in cross-section of another embodiment of the rotating body 41 and FIG. 6b represents a schematic view in longitudinal section of the another embodiment of the rotating body 41. In the embodiment illustrated in FIGS. 6a and 6b, the rotating body includes an outer tube 74 and an inner tube 75. A space 76 is formed between the outer tube 74 and the inner tube 75, which may, in turn, be filled with a medium. In addition, the inner tube 75 may be provided with a port 72 in order to be equally filled with, or traversed by, a medium. In this embodiment, the inner tube 75 can be held stationary and the outer tube 74 can be arranged to rotate with respect to the inner tube 75. Thus, a heavily stirred medium is provided in the space 76 therebetween, whereby an improved thermal transfer is achieved. The surface portions of the moving outer tube 74 and the stationary inner tube 75 that are associated with each other are preferably provided with a gasket.

FIG. 7a represents a schematic view in cross-section and FIG. 7b represents a schematic view in longitudinal section of yet another embodiment of a rotating body 41.

In this embodiment, again an outer tube 74 and an inner tube 75 are provided, with the tube 75 situated inwardly being equally in rotation. Provision may be made in this case for the inner and outer tubes 75, 74 to be driven in the same sense of rotation and at the same circumferential speed. Alternatively, angular velocities differing from each other may be provided and the tubes may be driven in opposite directions. The space 76 between the tubes is preferably filled with water and the interior space of the inner tube 75 is preferably filled with air.

FIG. 8 represents another alternative configuration. The rotating body 41 is formed as a hollow shaft or tube into which a cooling unit 78 shaped in the form of a cartridge may be inserted from one side. This cooling unit 78 includes an outer tube 81 and an inner tube 82, with a space 83 formed therebetween providing access, on one end thereof, for the supplied medium so as to enable its inflow into the interior space of the inner tube 82. Thus a forced circulation of the medium is realized. This cooling unit 78 is inserted into the hollow shaft. Preferably, a bearing formed on one side, also referred to as a cantilever bearing, is provided.

A number of embodiments of the invention have been described. Nevertheless, it will be understood that various modifications may be made without departing from the spirit and scope of the invention.

What is claimed is:

1. A beam capturing device for a processing machine, said beam capturing device comprising:
   a housing including a substantially linear opening for receiving a cutting beam from the processing machine during processing of a workpiece; and
   at least one rotating body arranged beneath the opening in the housing,
   wherein the at least one rotating body comprises a roller that extends along the length of the opening of the housing;
   the at least one rotating body is arranged off-center with respect to the cutting beam entering the housing through the opening; and the at least one rotating body is arranged to be rotationally driven about its axis of rotation and to absorb energy from the cutting beam entering the housing through the opening.

2. The beam capturing device of claim 1, wherein the off-center position of the at least one rotating body, relative to the housing, is variable and the at least one rotating body is movable at least in a direction transverse to the axis of rotation of the at least one rotating body.

3. The beam capturing device of claim 1, wherein the at least one rotating body is conically tapered toward at least one end face of the rotating body.

4. The beam capturing device of claim 1, wherein the rotating body comprises a solid roller.

5. The beam capturing device of claim 1, wherein the at least one rotating body comprises a hollow roller that is provided, on at least one end face, with a feeding appliance for supplying a medium to the hollow roller.

6. The beam capturing device of claim 1, wherein the at least one rotating body comprises a double-walled roller including an outer tube and an inner tube, the outer tube and the inner tube together defining a space that can be filled with a medium.

7. The beam capturing device of claim 6, wherein at least one end face of the inner tube includes an inlet port for feeding a medium into the space defined by the outer and inner tubes.

8. The beam capturing device of claim 6, wherein the outer tube and the inner tube are arranged in a rotatable manner with respect to each other.

9. The beam capturing device of claim 6, wherein the inner tube is disposed off-center with respect to the outer tube.

10. The beam capturing device of claim 1, wherein the at least one rotating body comprises:
a hollow roller; and
a cooling unit formed with double walls allowing for forced circulation of a medium, wherein the cooling unit is insertable into an interior space of the hollow roller.

11. The beam capturing device of claim 1, wherein the at least one rotating body is fabricated from a material having a high thermal conductivity.

12. The beam capturing device of claim 1, wherein an outer lateral area of the at least one rotating body has a roughened surface.

13. The beam capturing device of claim 1, further comprising a cleaning device for removing slag, sparks, and contaminants adhering to the at least one rotating body, wherein the cleaning device is arranged to act on an outer lateral area of the rotating body.

14. The beam capturing device of claim 13, wherein the cleaning device comprises one or more brushes, a scraper, a scratcher, or one or more rotating rollers.

15. The beam capturing device of claim 1, wherein the housing has at least one suction opening for connection to a suction device,
wherein the at least one suction opening is provided laterally in a wall portion of the housing or on a bottom of the housing, and
wherein, between the opening of the housing and the at least one rotating body, a feeding appliance is provided that has an inflow direction that is oriented perpendicular to the longitudinal extension of the at least one rotating body or to the opening of the housing.

16. The beam capturing device of claim 15, wherein the feeding appliance extends at least partially along the housing and, for introducing the medium, may be activated in segments or is capable of being activated depending on the position of the cutting beam entering the housing through the opening.

17. The beam capturing device of claim 1, wherein at least lateral wall portions of the housing are provided with a non-adhesion coating.

* * * * *